(12) United States Patent
Lee

(10) Patent No.: US 11,572,263 B2
(45) Date of Patent: Feb. 7, 2023

(54) TUBE OPENING AND CLOSING DEVICE AND DISPENSING SYSTEM INCLUDING SAME

(71) Applicant: BIOINFRA CO., LTD., Suwon-si (KR)

(72) Inventor: Sang Deuk Lee, Suwon-si (KR)

(73) Assignee: BIOINFRA CO., LTD., Suwon-si (KR)

(*) Notice: Subject to any disclaimer, the term of this patent is extended or adjusted under 35 U.S.C. 154(b) by 1091 days.

(21) Appl. No.: 16/309,692

(22) PCT Filed: Apr. 26, 2017

(86) PCT No.: PCT/KR2017/004402
§ 371 (c)(1),
(2) Date: Dec. 13, 2018

(87) PCT Pub. No.: WO2017/217655
PCT Pub. Date: Dec. 21, 2017

(65) Prior Publication Data
US 2019/0135605 A1  May 9, 2019

(30) Foreign Application Priority Data

Jun. 17, 2016  (KR) .................. 10-2016-0076006

(51) Int. Cl.
*B67B 7/14*   (2006.01)
*B01L 9/06*   (2006.01)
(Continued)

(52) U.S. Cl.
CPC ............... *B67B 7/14* (2013.01); *B01L 3/561* (2013.01); *B01L 9/06* (2013.01); *B65B 7/26* (2013.01); *B67B 3/22* (2013.01); *B01L 3/0289* (2013.01)

(58) Field of Classification Search
CPC .... B67B 3/02; B67B 3/22; B67B 7/14; B67B 7/16; B67B 7/162; B67B 7/164;
(Continued)

(56) References Cited

U.S. PATENT DOCUMENTS 3,784,826 A   1/1974  Bagshawe et al.
4,178,732 A  12/1979  Pfleger
(Continued)

FOREIGN PATENT DOCUMENTS

EP    0 703 457 A2   3/1996
JP    53-49479 U     4/1978
(Continued)

OTHER PUBLICATIONS

International Search Report for PCT/KR2017/004402 dated Aug. 8, 2017 [PCT/ISA/210].

*Primary Examiner* — Justin N Olamit
(74) *Attorney, Agent, or Firm* — Sughrue Mion, PLLC

(57) ABSTRACT

According to one embodiment of the present invention, a tube opening and closing device capable of opening and closing a lid of a tube and comprising a container, a lid coupled to the container so as to enable the container to be blocked, and a joint part for connecting the container and a first side of the lid comprises: a tube supporting rack having a plurality of openings formed on one surface thereof, wherein the containers of the tubes can be inserted into each of the plurality of openings; an opening and closing part positioned at an upper part of the tube supporting rack, rotating around a first rotary shaft and having a coupling groove in which a second side of the lid, which faces the first side of the tube, can be accommodated; and a driving part for rotating the opening and closing part, wherein the lid can be opened and closed with respect to the container through the rotation of the opening and closing part.

13 Claims, 13 Drawing Sheets

(51) Int. Cl.
   *B65B 7/26* (2006.01)
   *B67B 3/22* (2006.01)
   *B01L 3/00* (2006.01)
   *B01L 3/02* (2006.01)

(58) Field of Classification Search
   CPC ... B67B 3/20–2093; B67B 7/18; B67B 7/182; B65B 7/26; B01L 3/0289; B01L 3/09; B01L 3/561
   See application file for complete search history.

(56) References Cited

U.S. PATENT DOCUMENTS

| | | | |
|---|---|---|---|
| 4,683,782 A | | 8/1987 | Warburg |
| 4,696,144 A | * | 9/1987 | Bankuty ................. B67B 3/206 53/317 |
| 4,858,502 A | | 8/1989 | Warburg |
| 5,628,962 A | * | 5/1997 | Kanbara ................ G01N 35/04 222/549 |
| 6,309,603 B1 | | 10/2001 | Locke |
| 8,136,679 B2 | * | 3/2012 | Fry .................... B01L 3/50855 211/85.18 |
| 8,485,357 B2 | * | 7/2013 | Song ........................ B01L 9/00 211/74 |
| 8,539,682 B2 | * | 9/2013 | Mah ......................... B67B 7/34 30/409 |
| 9,052,299 B2 | * | 6/2015 | Jones ..................... G01N 35/04 |
| 9,849,457 B2 | * | 12/2017 | Gelfand ................ B01L 3/5457 |
| 9,896,317 B2 | * | 2/2018 | Bell ........................ B67B 1/045 |
| 2003/0103839 A1 | | 6/2003 | Osborne et al. |
| 2008/0209709 A1 | | 9/2008 | Mayer |
| 2014/0331618 A1 | | 11/2014 | Guggisberg et al. |
| 2016/0376137 A1 | | 12/2016 | Bell |

FOREIGN PATENT DOCUMENTS

| | | | |
|---|---|---|---|
| JP | 64-61667 A | | 3/1989 |
| JP | 2-500265 A | | 2/1990 |
| JP | 4-10046 A | | 1/1992 |
| JP | 5-58696 U | | 8/1993 |
| JP | H0558696 U | * | 8/1993 |
| JP | 6-230013 A | | 8/1994 |
| JP | 8-94624 A | | 4/1996 |
| JP | 2004-537319 A | | 12/2004 |
| JP | 2007-97476 A | | 4/2007 |
| JP | 2007-511420 A | | 5/2007 |
| JP | 2013-532053 A | | 8/2013 |
| KR | 10-0659278 B1 | | 12/2006 |
| KR | 10-2008-0103014 A | | 11/2008 |
| KR | 10-2010-0015191 A | | 2/2010 |
| WO | 03/014290 A1 | | 2/2003 |
| WO | 2006/003221 A1 | | 1/2006 |
| WO | 2008/004695 A1 | | 1/2008 |
| WO | 2014/136676 A1 | | 9/2014 |

* cited by examiner

TUBE OPENING AND CLOSING DEVICE AND DISPENSING SYSTEM INCLUDING SAME

CROSS-REFERENCE TO RELATED APPLICATION

This application is a National Stage of International Application No. PCT/KR2017/004402, filed on Apr. 26, 2017, which claims priority to and the benefit of Korean Patent Application No. 10-2016-0076006 filed in the Korean Intellectual Property Office on Jun. 17, 2016, the entire contents of which are incorporated herein by reference.

TECHNICAL FIELD

The present invention relates to a tube opening and closing device and a dispensing system including the same.

BACKGROUND ART

In order to analyze a test such as blood, sputum, living tissue, cell culture fluid, etc. using a variety of methods such as nucleic acid isolation and purification, gene amplification, sequencing, immunofluorescence method, etc., a test liquid (hereinafter, referred to as a sample) is transferred to a well plate or the like and then analyzed.

In this case, an operator put a sample obtained from a patient or the like in a tube and seal the tube with a lid. Afterwards, in order to analyze the sample contained in the tube, the sample is transferred to a well of a well plate by using a pipette device or the like.

However, when the operator separates the lid of the tube, the operator may contact the tube and this may cause contamination of the sample in the tube, and the operator may drop the tube while separating the lid of the tube. In addition, when putting the tube back to the plate, the operator may be confused about the position of the tube.

DISCLOSURE

Technical Problem

Based on the above-described technical background, the present invention is to provide a tube opening and closing device for safely separating a lid of a tube with respect to a container.

Technical Solution

In one general aspect of the present invention, there is provided a tube opening and closing device capable of opening and closing a lid of a tube which comprises a container, a lid coupled to the container so as to enable the container to be blocked, and a joint part for connecting the container and a first side of the lid, the tube opening and closing device including: a tube supporting rack having a plurality of openings formed on one surface thereof, wherein the containers of the tubes are insertable into the plurality of openings, respectively; an opening and closing part positioned at an upper part of the tube supporting rack, rotating around a first rotary shaft, and having a coupling groove into which a second side of the lid, facing the first side of the tube, is allowed to be accommodated; and a driving part for rotating the opening and closing part, wherein the lid is opened and closed with respect to the container by the rotation of the opening and closing part.

The tube supporting rack may include: a plurality of concave parts extending in a first direction and spaced apart from each other in a second direction crossing the first direction; and a plurality of convex parts each disposed between a pair of adjacent concave parts among the plurality of concave parts, and extending in the first direction to be parallel to the plurality of concave parts, and the plurality of openings may be formed in the plurality of convex parts, respectively.

Each of the plurality of concave parts may include a plurality of accommodation grooves spaced apart from each other in the first direction.

The plurality of openings may be arranged in the first direction to be parallel to the plurality of convex parts, respectively.

A mounting groove in contact with each of the plurality openings and accommodating the joint part may be formed in each of the plurality of convex parts.

The tube supporting rack may be capable of moving in the second direction under the opening and closing part.

The opening and closing part may extend in the first direction, and the first rotary shaft is parallel to the first direction.

The opening and closing part may be in a plate shape.

One side end of the opening and closing part may be bent to form the coupling groove.

One side end of the opening and closing part may be bent to form a bent surface, and a through-hole may be formed in the bent surface, the through-hole into which one side end of the lid is insertable.

The driving part may include: a first worm wheel coupled to the first rotary shaft; a first worm gear rotating in engagement with the first worm wheel; and a first driving shaft disposed in parallel with the second direction, and coupled to the first worm gear to rotate along with the first worm gear.

The driving part further may include: a second worm wheel coupled to the first driving shaft; a second worm gear rotating in engagement with the second worm wheel; and a second driving shaft disposed in parallel with the first direction, and coupled to the second worm gear to rotate along with the second worm gear.

The driving part may further include a power part connected to the second driving shaft to rotate the second driving shaft.

The power part may include an electronic motor.

The first worm wheel, the first worm gear, and the first driving shaft may be disposed on both side ends of the opening and closing part.

The driving part may be capable of adjusting a speed of rotation of the opening and closing part.

In another general aspect of the present invention, there is provided a dispensing system comprising: a tube opening and closing device; a reader device for reading identification marks displayed on lids of the tubes in a tube support rack of the tube opening and closing device; a determination device for determining, based on information acquired through the reader device, whether or not the respective tubes are disposed at determined positions in the tube supporting rack; and a pipette device for transferring samples in the tubes at the determined positions in the tube supporting rack to corresponding positions in a plate corresponding to the tube supporting rack.

The reader device may include an optical character reader.

The dispensing system may further include an identification mark recording device for displaying the identification marks on the lids of the tubes.

The identification mark recording device may display the identification marks using a laser.

Advantageous Effects

According to the above tube opening and closing apparatus, it is possible to quickly separate a lid with respect to a container of a tube.

In addition, it is possible to avoid contact between an operator and the tube in a process of separating the lid of the tube.

In addition, it is possible to prevent spills of a sample contained in the tube in the process of separating the lid of the tube.

MODE FOR INVENTION

Figure 1:
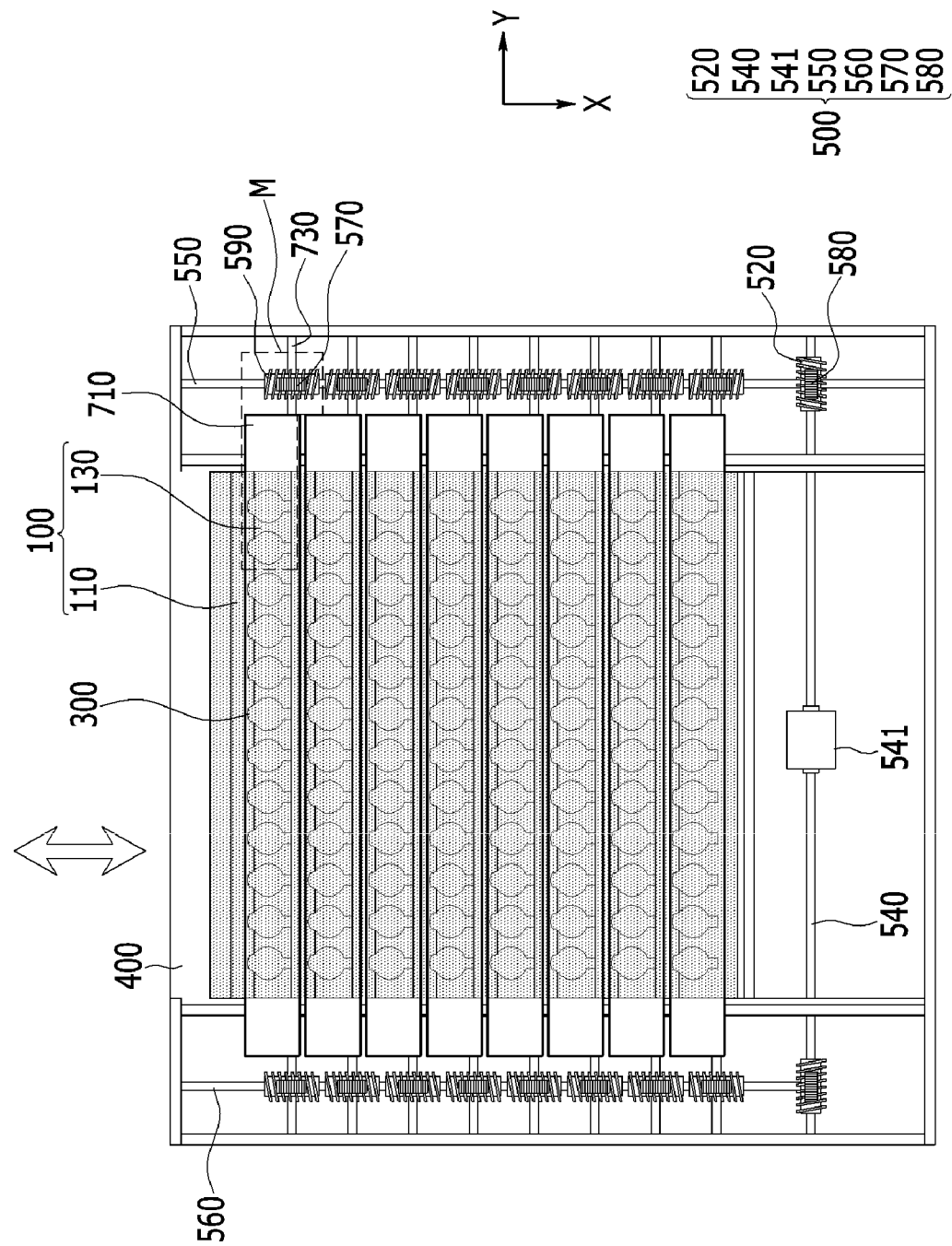
FIG. 1 I is a plan view of a tube opening and closing device according to an embodiment of the present invention.

Hereinafter, an embodiment of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiment set forth herein. In the drawings, anything unnecessary for describing the present invention will be omitted for clarity, and also like reference numerals in the drawings denote like elements.

In the drawings, the thicknesses of constituent elements may be arbitrarily illustrated for convenience of illustration, and thus, the embodiment of the invention is not limited to the illustrated thicknesses.

In the drawings, the thickness of layers and regions may be enlarged for clarity. In addition, in the drawings, the thickness of some layers and regions may be exaggerated for clarity. In addition, it will be understood that when one element such as a layer, a film, a region or a plate is referred to as being "on" or "above" another element, the one element may be "directly on" the another element, and one or more intervening elements may also be present.

In addition, in the entire specification, when an element is referred to as "including" another element, the element should not be understood as excluding other elements so long as there is no special conflicting description, and the element may include at least one other element. In addition, it will be understood that, when an element is referred to as being "on" another element, this means that the element is located above or below the other element and does not mean that the element is necessarily located above the other element in the direction of gravity.

Hereinafter, a tube opening and closing device according to an embodiment of the present invention will be described with reference to FIGS. 1 to 15.

Figure 2:
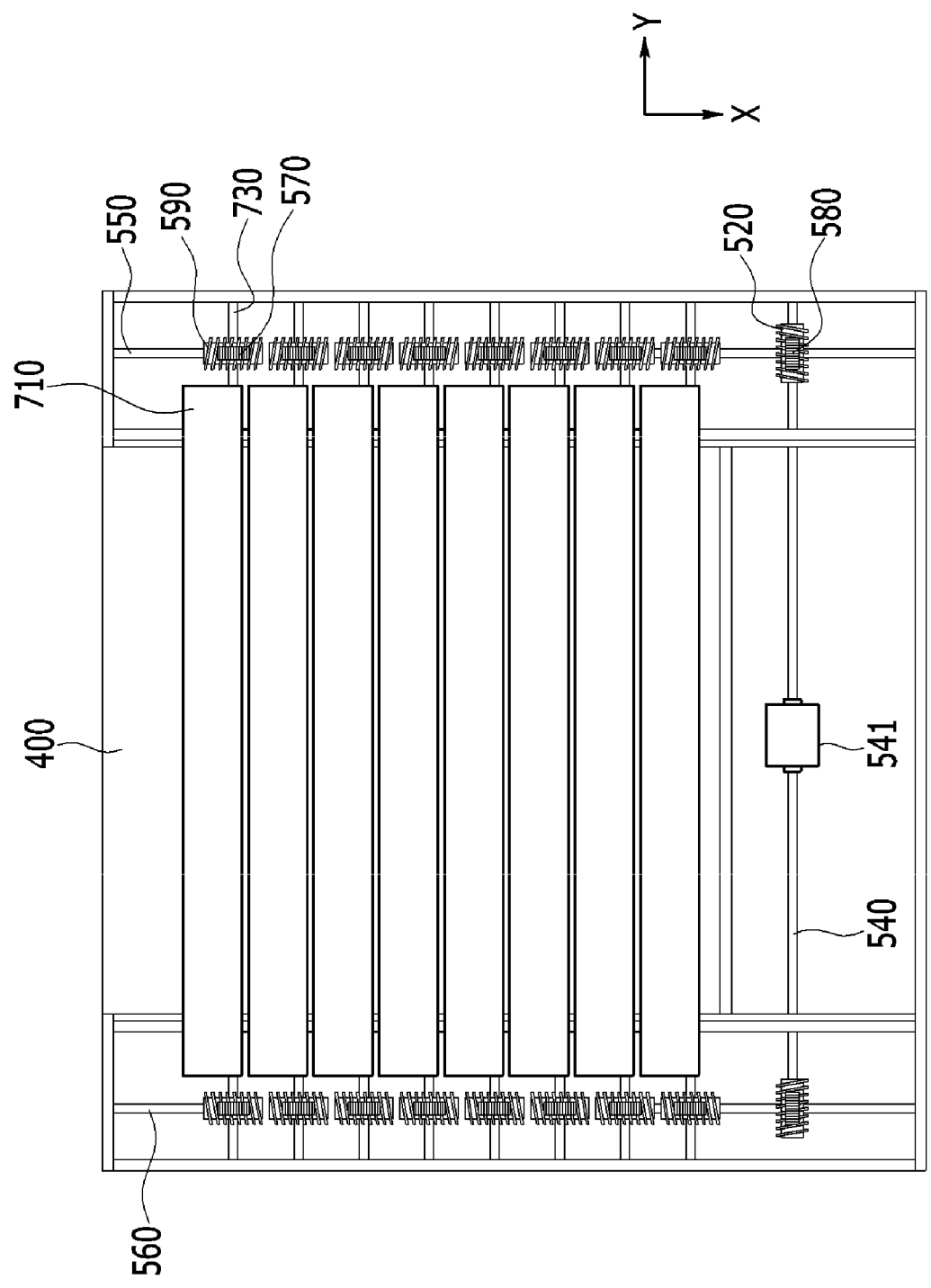
FIG. 2 is a diagram illustrating a state in which a tube supporting rack has yet to be coupled to the tube opening and closing device shown in FIG. 1.
Figure 3:
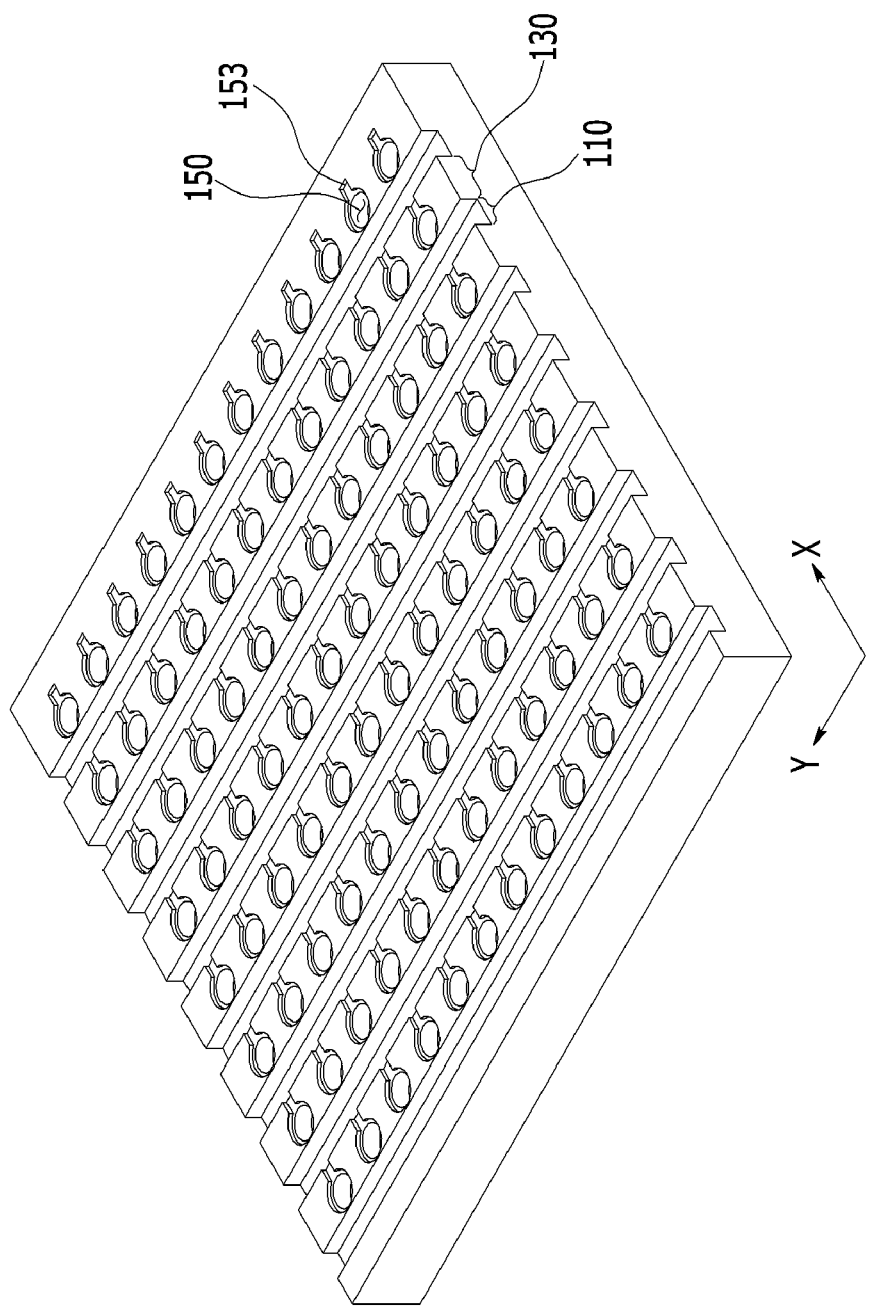
FIG. 3 is a perspective view of a tube supporting rack of a tube opening and closing device according to an embodiment of the present invention.
Figure 4:
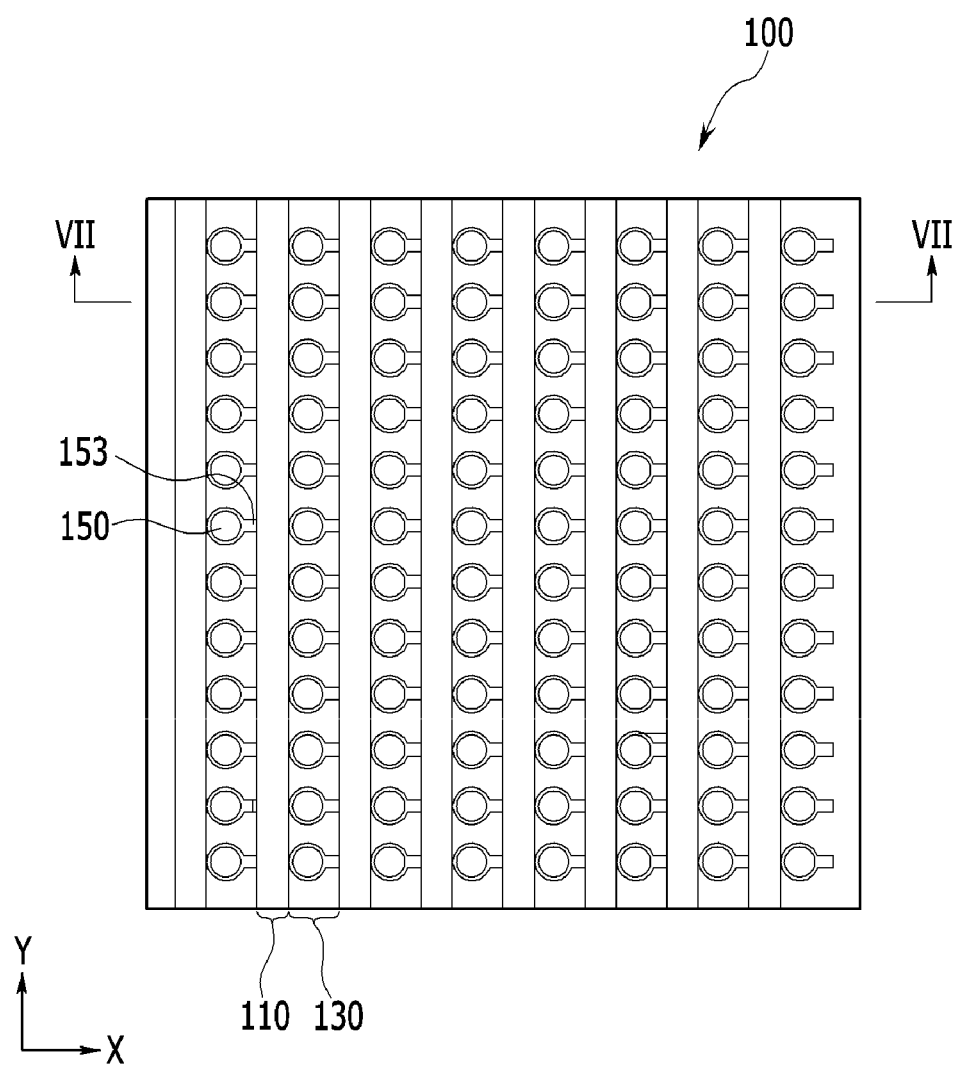
FIG. 4 is a plan view of a tube opening and closing device according to an embodiment of the present invention.
Figure 5:
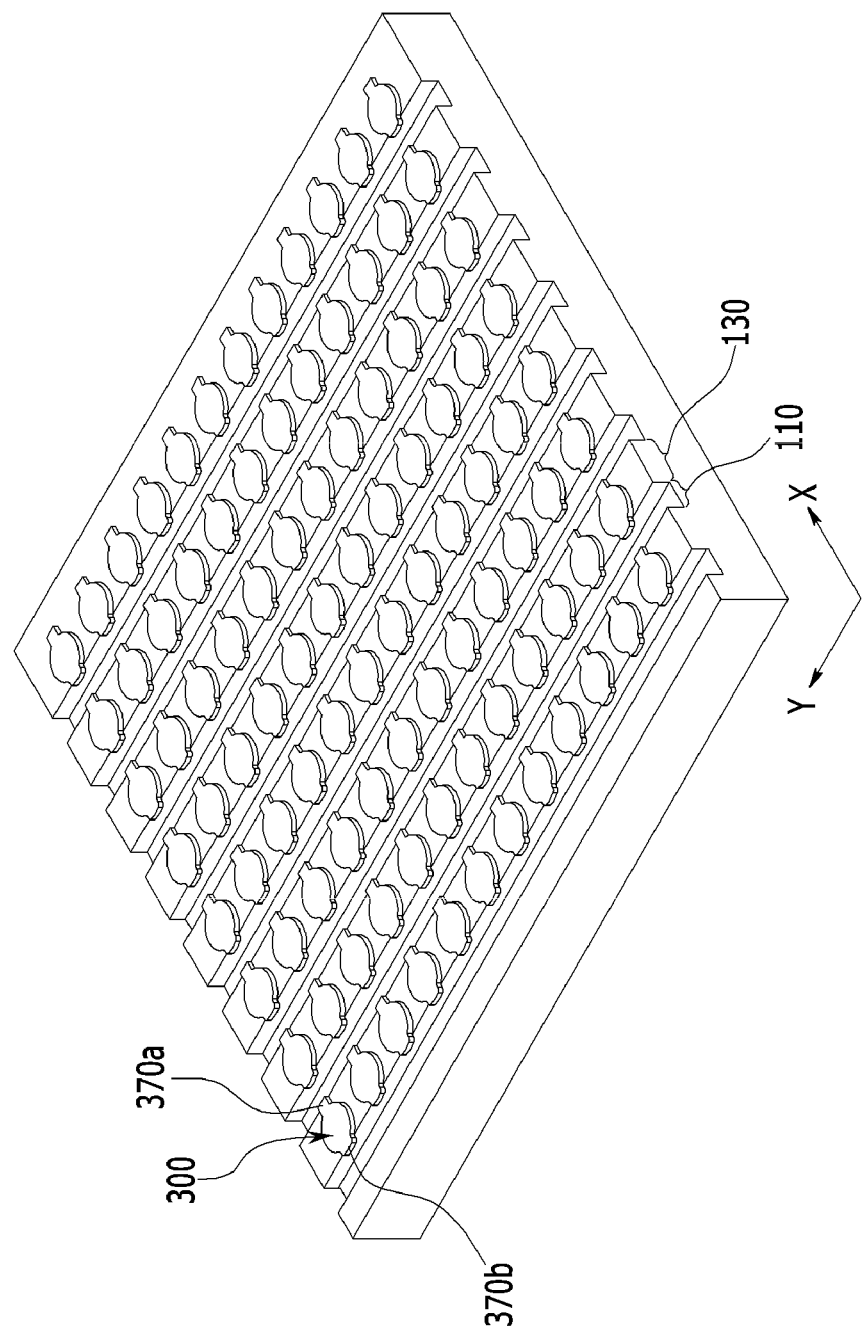
FIG. 5 is a diagram illustrating a state in which tubes are mounted to the tube supporting rack shown in FIG. 3.
Figure 6:
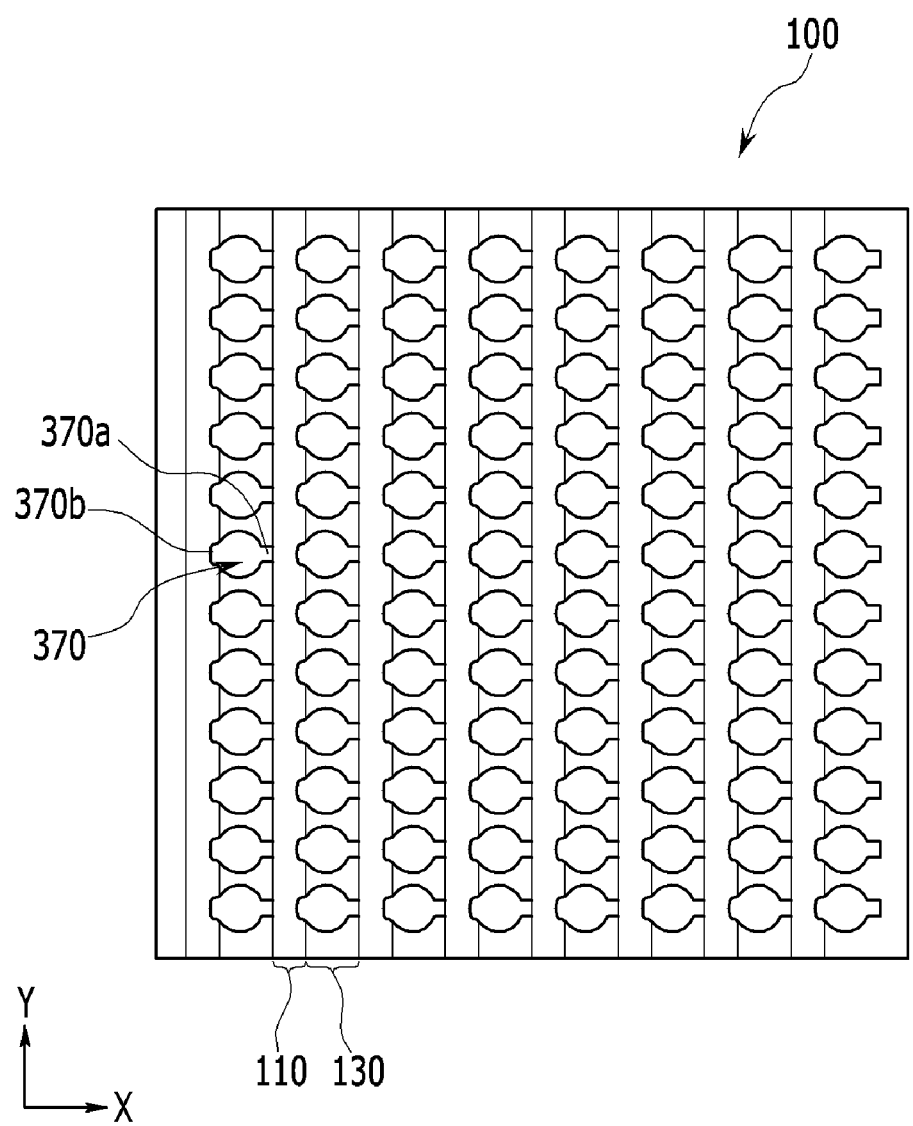
FIG. 6 is a diagram illustrating a state in which tubes are mounted to the tube supporting rack shown in FIG. 4
Figure 7:
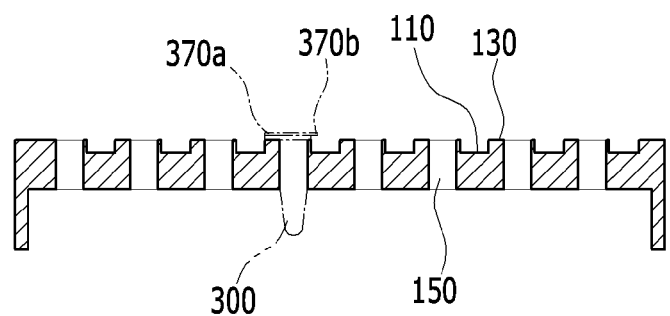
FIG. 7 is a cross-sectional view taken along line VII-VII shown in FIG. 4.
Figure 8:
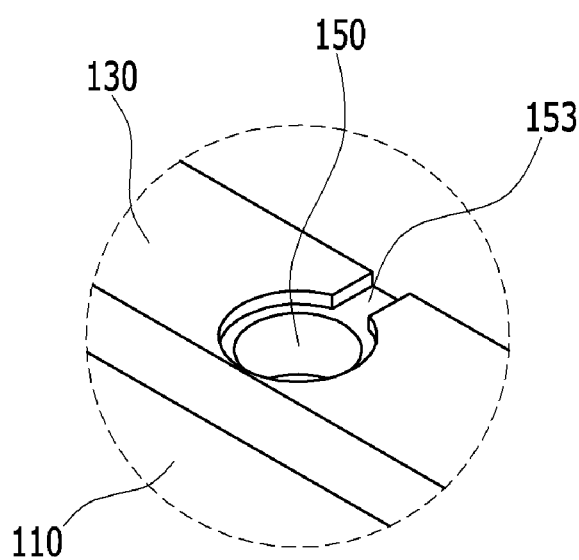
FIG. 8 is an enlarged view of an opening of the tube supporting rack shown in FIG. 3.

FIG. 1 I is a plan view of a tube opening and closing device according to an embodiment of the present invention, FIG. 2 is a diagram illustrating a state in which a tube supporting rack has yet to be coupled to the tube opening and closing device shown in FIG. 1, and FIG. 3 is a perspective view of a tube supporting rack of a tube opening and closing device according to an embodiment of the present invention. FIG. 4 is a plan view of a tube opening and closing device according to an embodiment of the present invention, FIG. 5 is a diagram illustrating a state in which tubes are mounted to the tube supporting rack shown in FIG. 3, and FIG. 6 is a diagram illustrating a state in which tubes are mounted to the tube supporting rack shown in FIG. 4. FIG. 7 is a cross-sectional view taken along line VII-VII shown in FIG. 4, and FIG. 8 is an enlarged view of an opening of the tube supporting rack shown in FIG. 3.

Referring to FIGS. 1 and 2, a tube opening and closing device according to this embodiment may include a tube supporting rack 100, a supporting plate 400, an opening and closing part 710, and a driving part 500. In this embodiment, a lid 370 may be automatically opened by the opening and closing part 710 with respect to a container 310 of a tube 300 inserted into the tube supporting rack 100. In this case, the opening and closing part 710 may operate automatically by the driving part 500.

Referring to FIGS. 3 and 4, the tube supporting rack 100 may support a plurality of tubes 300. The tube supporting rack 100 may include a plurality of concave parts 110 and a plurality of convex parts 130. In this case, the tube supporting rack 100 may be formed of a resin metal material such as polypropylene, polystyrene, or the like.

Each of the plurality of concave parts 110 may extend in a first direction (Y direction in the drawings). In addition, the plurality of concave parts 110 may be spaced apart from each other in a second direction (X direction in the drawings) which intersects the first direction. In this embodiment, each of the plurality of concave part 110 may be in a shape of a groove extending in the first direction. However, aspects of the present invention are not limited thereto, and each of the plurality the concave parts 110 may be in a shape in which a plurality of accommodating grooves (not shown) is spaced apart from each other in the first direction.

Meanwhile, similar to the plurality concave parts 110, the plurality of convex parts 130 may extend in the first direction. Each of the plurality of convex parts 130 may be disposed between concave parts 110. That is, each of the plurality of convex parts 130 may be disposed between a pair of neighboring concave parts 110 among the plurality of concave parts 110. Accordingly, the plurality of concave parts 110 and the plurality of convex parts 130 may be disposed in parallel with in the first direction.

In this embodiment, a plurality of openings 150 may be formed on upper surfaces of the plurality of convex parts 130. Similarly to the plurality of convex parts 130, the plurality of openings 150 may be disposed in the first direction to be in parallel.

The tube 300 may be inserted into each of the plurality of openings 150. In this case, a diameter of each of the plurality of openings 150 may correspond to an outer diameter of the tube 300. More specifically, the diameter of each opening 150 may be equal to or greater than an outer diameter of the container 310 of the tube 300. Even when the diameter of each opening 150 is greater than the outer diameter of the container 310 of the tube 300, the tube 300 does not fall into a corresponding opening 150 due to presence of a projected portion 350 (see FIGS. 13 and 14), which is formed on an upper side of the container 310 and extends outward in a radial direction of the container 310.

Referring to FIG. 8, in the plurality of convex parts 130, a mounting groove 153 may be formed adjacent to each opening 150. The mounting groove 153 may accommodate a joint part 380 for connecting the container 310 and the lid 370 of the tube 300.

According to this embodiment, twelve openings 150 are formed in each of the plurality of convex parts 130, and eight convex parts 130 may be provided. That is, ninety six openings 150 may be formed in the tube supporting rack 100. Accordingly, as illustrated in FIGS. 5 and 6, ninety six tubes 300 may be disposed in the tube supporting rack 100. However, the number of openings 150 formed in the tube supporting rack 100 is not limited thereto, and the number of openings 150 may be less or more than in the drawings.

Referring back to FIGS. 5 to 7, each tube 300 is disposed such that a virtual line connecting a first side 370*a* and a second side 370*b* of the lid 370 of a corresponding tube 300 is in parallel with the second direction. Here, the first side 370*a* of the lid 370 indicates a region coupled to the joint part 380 for connecting the container 310 and the lid 370, and the second side 370*b* of the lid 370 indicates a region facing the first side 370*a*. In this case, the first side 370*a* and the second side 370*b* may be positioned at both side ends of the lid 370, which face each other.

In this case, the second side 370*b* of the lid 370 of the corresponding tube 300 is projected in the second direction from the convex part 130. As the second side 370*b* of the lid 370 is projected in the second direction, the second side 370*b* is accommodated in a coupling groove 750 of the opening and closing part 710, which will be described later on, and accordingly, the lid 370 may be opened with respect to the container 310. Detailed description thereof will be provided later on.

Referring back to FIGS. 1, 2, and 9, the opening and closing part 710 may open the lid 370 by accommodating the second side 370*b* of the lid 370 of the tube 300 inserted into the tube supporting rack 100.

The opening and closing parts 710 is provided as a plurality of opening and closing parts, and each of the plurality of opening and closing parts 710 may extend in the first direction. In addition, the plurality of opening and closing parts 710 may be spaced from each other in the second direction.

According to this embodiment, the opening and closing part 710 may be disposed in correspondence to the plurality of convex parts 130 of the tube supporting rack 100, which may be positioned under the opening and closing part 710. Specifically, the openings and closing part 710 may be disposed over the plurality of convex parts 130, respectively. That is, under the opening and closing part 710, the plurality of convex parts 130 with the tubes 300 inserted thereinto may be disposed.

Figure 9:
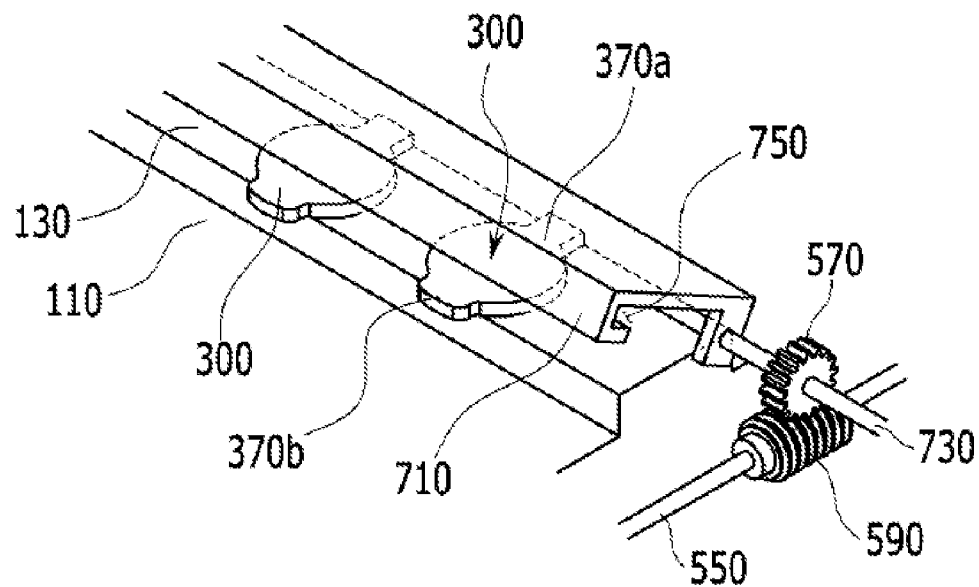
FIG. 9 is an enlarged view or a region M shown in FIG. 1.
Figure 9:

Meanwhile, referring to FIG. 9, the opening and closing part 710 may be coupled to a first rotary shaft 730, thereby enabled to rotate around the first rotary shaft 730. In this case, the first rotary shaft 730 may be disposed in parallel with the first direction. That is, the opening and closing part 710 may rotate around the first direction.

In this embodiment, the opening and closing part 710 may be formed in a plate shape. In this case, one side end of the opening and closing part 710 may be bent to form the coupling groove 750. The second side 370*b* of the lid 370 may be accommodated inside the coupling groove 750 formed as a result of the bending, and, if the opening and closing part 710 rotates around the first rotary shaft 730, the lid 370 accommodated in the coupling groove 750 may rotate around the first rotary shaft 730 as well. However, aspects of the present invention are not limited thereto, and one side end of the opening and closing part 710 may be bent to form a bent surface. The second side 370*b* of the lid 370 may be inserted into a through-hole 715 (see FIG. 10) in the bent surface. A process of how the lid 370 is opened by the rotation of the opening and closing part 710 will be later described in detail.

Referring back to FIGS. 1 and 2, the driving part 500 may be positioned on the supporting plate 400 and rotate the opening and closing part 710. The driving part 500 may include a first worm wheel 570, a first worm gear 590, a second worm wheel 580, a second worm gear 520, a first driving shaft 550 and 560, a second driving shaft 540, and a power part 541.

The first driving shaft 550 and 560 is disposed in parallel with the second direction. A pair of first driving shafts 550 and 560 may be respectively disposed on side ends of the plurality of opening and closing parts 710 disposed in parallel with each other. In this case, the pair of first driving shafts 550 and 560 may be aligned in parallel with each other. The pair of first driving shafts 550 and 560 is disposed to cross the first rotary shafts 730 coupled to the plurality of opening and closing parts 710.

Figure 10:
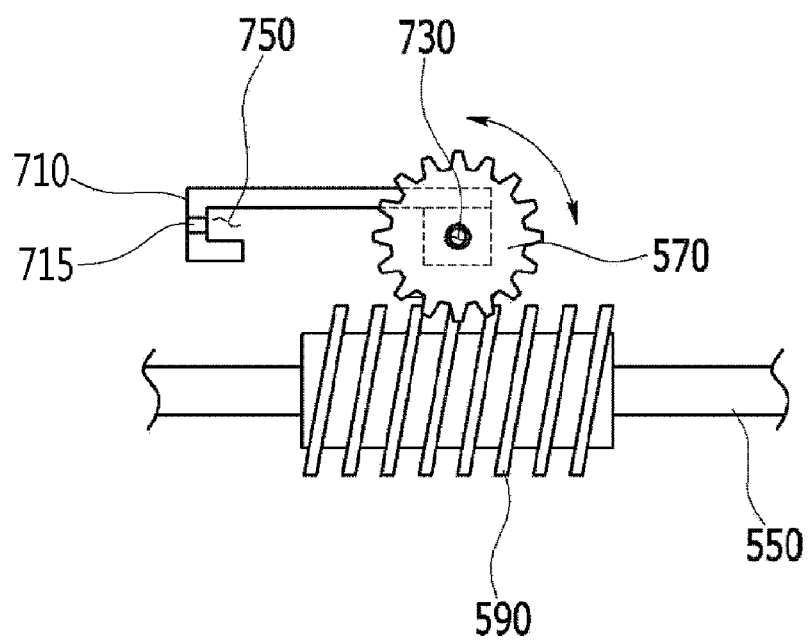
FIG. 10 is a side view schematically illustrating a driving part shown in FIG. 9.
Figure 11:
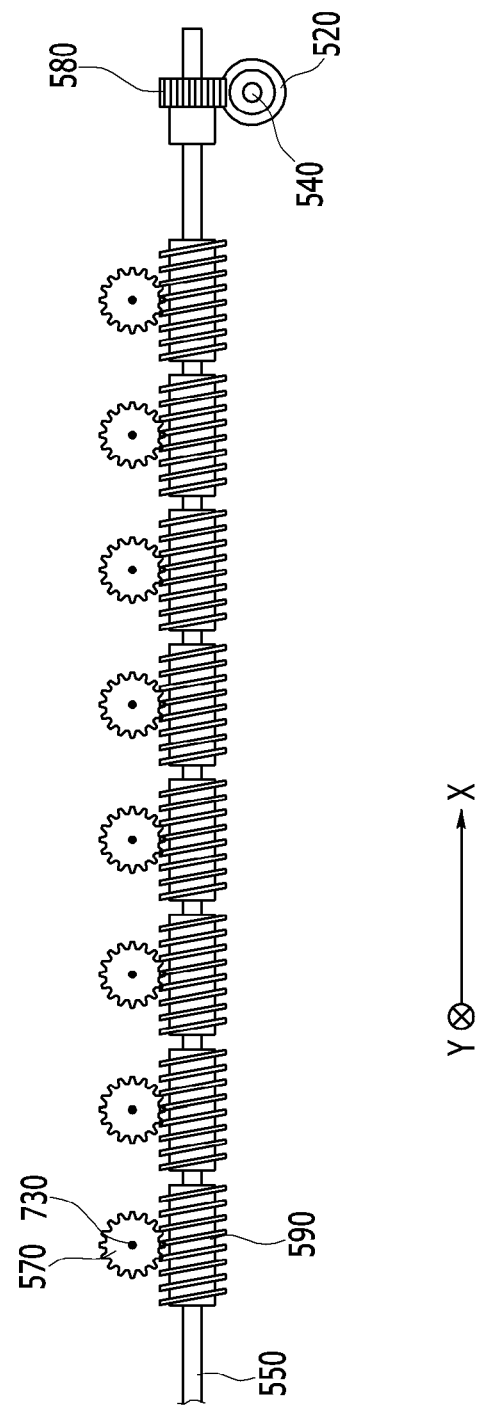
FIG. 11 is a view illustrating connection of first and second worm gears and second and second worm wheels.

Referring to FIGS. 9 and 10, the first driving shafts 550 and 560 and the first rotary shafts 730 may rotate in engagement with each other by worm gears and worm wheels. More specifically, the first worm wheel 570 is coupled to the first rotary shaft 730, and the first worm gear 590 is coupled to the first driving shafts 550 and 560. The first worm gear 590 and the first worm wheel 570 are disposed to be engaged with each other, and accordingly, if the first worm gear 590 rotates, the first worm wheel 570 engaged with the first worm gear 590 may rotate.

In this case, if the first driving shafts 550 and 560 coupled to the first worm gear 590 rotate, the first worm gear 590 may rotate and the first worm wheel 570 engaged with the first worm gear 590 may rotate as well. In addition, in response to rotation of the first worm wheel 570, the first rotary shaft 730 coupled to the first worm wheel 570 may rotate and this eventually cause the opening and closing parts 710 to rotate. By the first worm gear 590 and the first worm wheel 570, a rotational force may be delivered to the first driving shafts 550 and 560 and the first rotary shaft 730 which are disposed to cross each other Referring back to FIGS. 1, 2, and 11, the first worm gear 590 and the first worm wheel 570 may be disposed for each of the plurality of opening and closing parts 710. That is, the first worm gear 590 and the first worm wheel 570 may be deposed at both side ends of each opening and closing part 710.

Accordingly, a plurality of first worm gears 590 may be spaced apart from each other at a predetermined interval in the first driving shafts 550 and 560. In addition, the first worm wheel 570 may be coupled to the first rotary shaft 730 of each opening and closing part 710.

Accordingly, if the first driving shafts 550 and 560 rotate, every first worm gear 590 coupled to the first driving shafts 550 and 560 rotates. In addition, as a first worm wheel 570 coupled to each first worm gear 590 rotates, the plurality of opening and closing parts 710 may rotate simultaneously.

Meanwhile, the second driving shaft 540 may be disposed to cross the first driving shafts 550 and 560. The second driving shaft 540 may be disposed in parallel with the opening and closing part 710.

The second worm wheel 580 is coupled to each of the first driving shafts 550 and 560, and a pair of second worm gears 520 is coupled to the second driving shaft 540. A pair of second worm gears 520 and a pair of second worm wheels 580 may be disposed in such a way as to be capable of rotating with being engaged with each other.

In conclusion, when the second rotary shaft 540 rotates, the first driving shafts 550 and 560 rotate by the second worm gear 520 and the second worm wheel 580. In addition, when the first driving shafts 550 and 560 rotate, the first rotary shafts 730 rotate by the first worm gear 590 and the first worm wheel 570. Accordingly, when the second driving shaft 540 rotates, the opening and closing part 710 coupled to the first rotary shaft 730 is caused to rotate.

In this embodiment, the driving part 500 includes worm wheels and worm gears, but aspects of the present invention are not limited thereto, and the driving part 500 may be comprised of a rack and a pinion.

According to this embodiment, the power part 541 may be coupled to the second driving shaft 540. The power part 541 may provide a driving force to cause the second driving shaft 540 to rotate. For example, the power part 541 may be an electronic motor. However, aspects of the present invention are not limited thereto, and a handle using which an operator is able to manually rotate the second driving shaft 540 may be coupled to the power part 541.

Figure 12A:
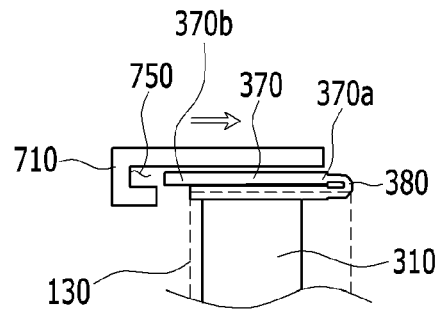
FIGS. 12(A) to 12(C) are diagram illustrating a process of how a lid of a tube is opened by an opening and closing part.

Hereinafter, with reference to FIG. 12, a process of how to separate the lid 370 of the tube 300 with respect to the container 310 by a tube opening and closing device according to this embodiment will be described.

First, the tube supporting rack 100 with the tubes 300 inserted thereinto is placed under the opening and closing part 710. In this case, the tube supporting rack 100 may be positioned under the opening and closing part 710 by moving in the second direction in FIGS. 1 and 2.

Before the tube supporting rack 100 is positioned under the opening and closing part 710, the opening and closing part 710 is inclined at a predetermined angle relative to a horizontal plane so that the opening and closing part 710 does not intervene the tube supporting rack 100. That is, as illustrated in FIG. 9, the opening and closing part 710 rotates in a clockwise direction around the first rotary shaft 730 to be inclined at a predetermined angle relative to the supporting plate 400.

In this case, the convex parts 130 of the tube supporting rack 100 with the tubes 300 inserted thereinto are positioned under the opening and closing part 710. When the convex parts 130 are positioned under the opening and closing part 710, the driving part 500 is rotated in a counter-clockwise direction to move the opening and closing part 710 so that the opening and closing part 170 and the lid 370 are horizontal to each other.

Figure 12B:
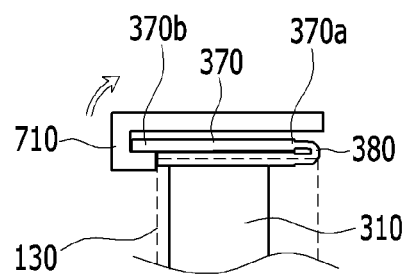
Figure 12C:
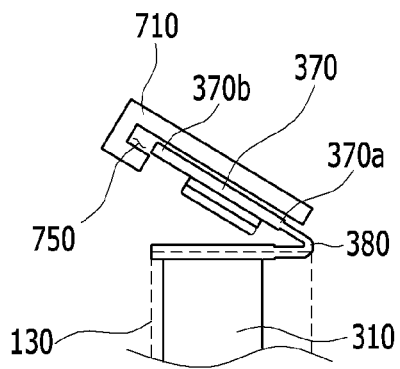
Figure 13:
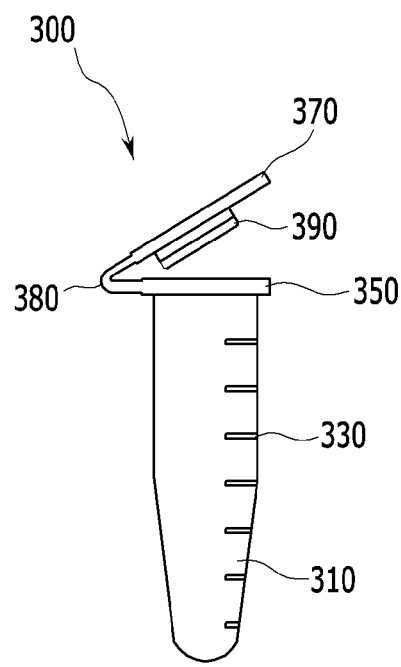
FIG. 13 is a diagram illustrating a tube with an opened lid.
Figure 14:
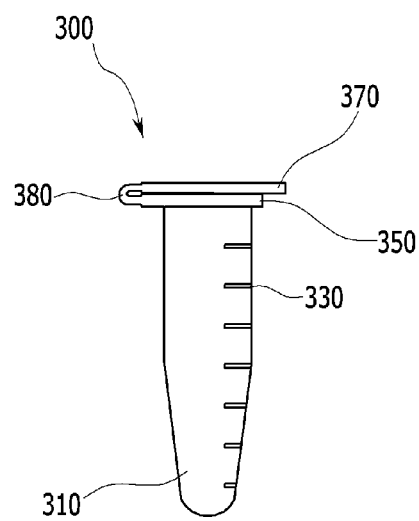
FIG. 14 is a diagram illustrating a tube with a closed lid.

Next, as illustrated in FIG. 12(B), the tube supporting rack 100 moves such that the second side 370b of the lid 370 is inserted into the coupling groove 750 of the opening and closing part 710. Next, as illustrated in FIG. 12(C), the opening and closing part 710 is rotated around the first rotary shaft 730 such that the lid 370 is separated with respect to the container 310.

Meanwhile, a polymerase chain reaction (PCR) tube, an Eppendorf tube, a micro tube, etc. may be used as the tube 300 used in this embodiment. However, aspects of the present invention are not limited thereto, and a tube applied to this embodiment may be any type of tube with a container having a lid, especially a tube in a structure in which a container and a lid are coupled by a joint part.

In order to analyze a test such as blood, sputum, living tissue, cell culture fluid, etc. using a variety of methods such as nucleic acid isolation and purification, gene amplification, sequencing, immunofluorescence method, etc., a sample in the tube 300 needs to be supplied to a well plate or an analyzer. In this case, in order to supply the sample to the well plate or the like, it is necessary to open the lid 370 with respect to the container 310 of the tube 300 before taking the sample out of the tube 300.

According to the present invention, the lids 370 of the plurality of tubes 300 may be opened simultaneously by the opening and closing part 710. Accordingly, a time required to transfer samples from the tubes 300 to a well plate or the like may be reduced. In addition, by reducing the transfer time, a time in which samples are exposed to the atmosphere due to opening of the lids 370 may be reduced.

Meanwhile, since the lids 370 of the tubes 300 are opened by the opening and closing part 710, contact between an operator and the tubes 300 is prevented. Accordingly, contamination of samples contained in the tubes 300 may be prevented.

In addition, since the lids 370 of the tubes 300 are opened by the opening and closing part 710, it is possible to prevent an operator to spill the sample in the tubes 300 when separating the lids 370 of the tubes 300.

Hereinafter, a dispensing system according to an embodiment of the present invention will be described with reference to FIGS. 15 and 16. Detailed description about an elements identical to the above-described tube opening and closing device may be omitted.

Figure 15:
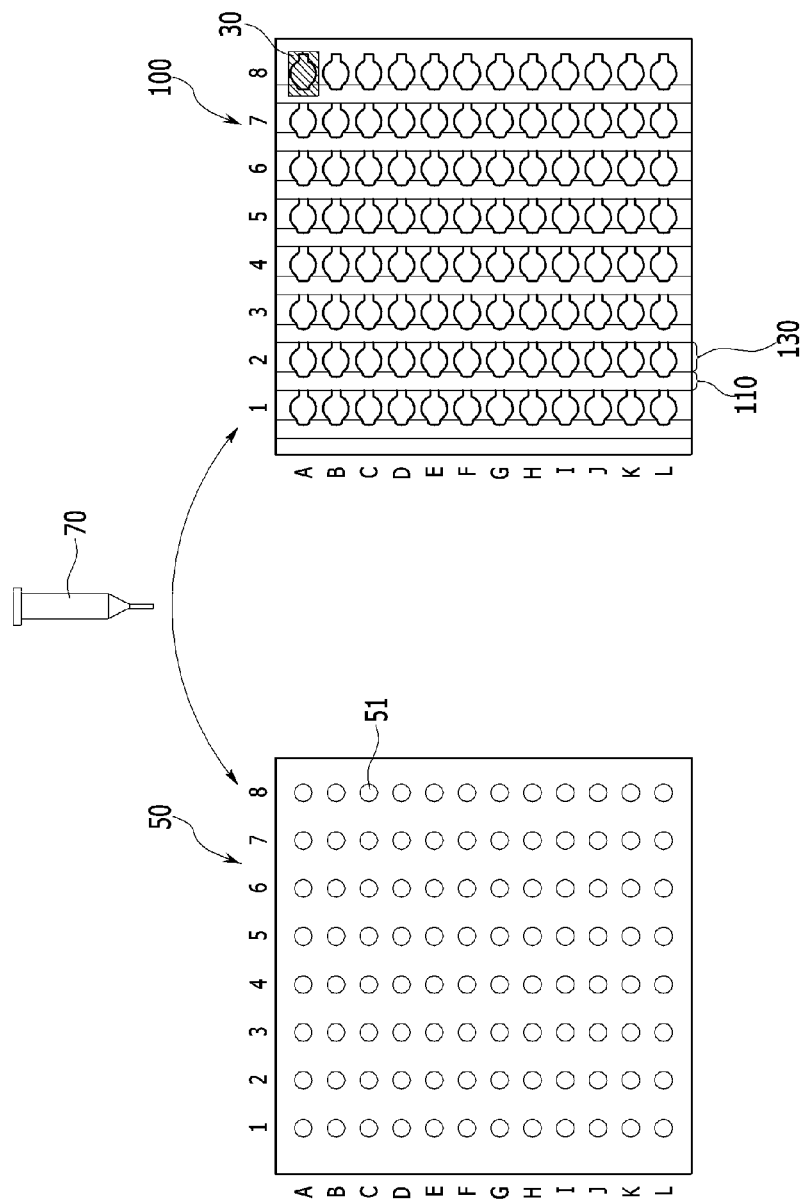
FIG. 15 is a dispensing system according to an embodiment of the present invention.
Figure 16:
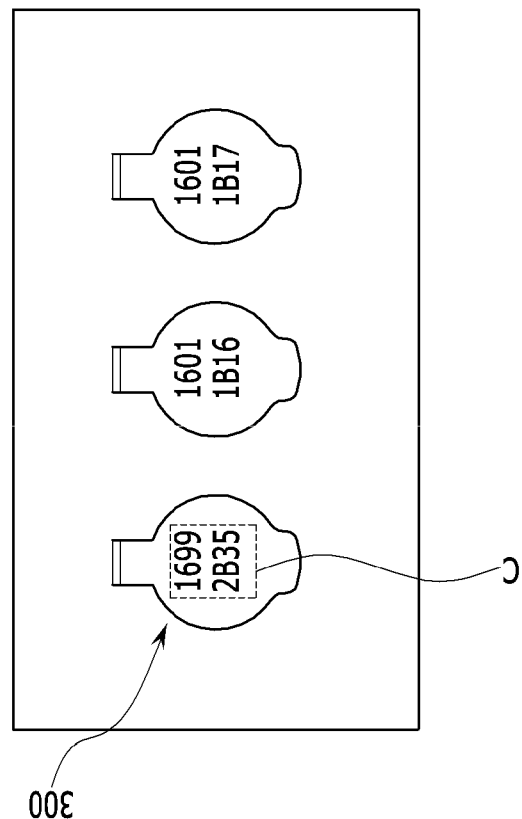
FIG. 16 is a diagram illustrating a state in which identification marks are displayed on lids of tubes.

FIG. 15 is a diagram schematically illustrating a dispensing system according to an embodiment of the present invention, and FIG. 16 is a diagram illustrating a state in which identification marks are displayed on lids of tubes.

Referring to FIG. 15, the dispensing system according to this embodiment may include the above-described tube opening and closing device, a reader device 30, a determination device (not shown), an identification mark recording device (not shown), and a pipette device 70. The dispensing system according to this embodiment may be enabled to transfer samples in the tubes 300 positioned in the tube supporting rack 100 of the above-described tube opening and closing device.

Referring to FIG. 16, the identification mark recording medium (not shown) may display unique identification marks C on the lids 370 of the tubes 300. The identification marks C are unique mark displayed to distinguish the tubes 300 from each other, and may include a text, a numeric value, a symbol, etc. for example, identification marks C of "1699 2B35", "1601 1B16", and "1601 1B17" may be displayed on the lids of the respective tubes 300 in FIG. 16. A sample A may be contained in the tube indicated with "1699 2B35", a sample B may be contained in the tube indicated with "1601 1 B16", and a sample C may be contained in the tube indicated with "1601 1B17". As such, if the unique identification marks C are displayed on the tubes 300, it may be possible to inform that a particular sample is contained in a particular tube, and such information may be constantly tracked and managed.

According to this embodiment, the identification mark recording device may display the identification marks C on the lids 370 of the respective tubes 300.

Meanwhile, the tubes 300 indicated with the identification marks C by the identification mark recording medium may be disposed at unique positions in the tube supporting rack 100 of the tube opening and closing device. For example, the tube indicated with "1699 2B35" in FIG. 16 may be disposed at an opening 150 of A-3 in the tube supporting rack 100. The tube indicated with "1601 1B6" may e disposed at an opening 150 of B-7 in the tube supporting rack 100. In addition, the tube indicated with "1601 1B17" may be disposed at an opening 150 of J-5 in the tube supporting rack 100. Here, as to "A-3", "B-7", and "J-5" indicating the positions of the respective openings 150, an alphabet indicates a row and a numeric value indicates a column.

Position information of the tubes 300 may be contained in the determination device (not shown). That is, in the determination device (not shown), information indicating that a tube 300 with which sample contained therein is disposed at an opening 150 at which position may be contained. For example, an operator may by himself/herself record, in the determination device, information that a particular tube 300 is disposed at a particular opening 150 of the tube supporting rack 100.

Meanwhile, the reader device 30 may read the identification marks C displayed on the lids 370 of the tubes 300. For example, the reader device 30 may be implemented as an optical character reader. The reader device 30 may read a text and a numeric value indicated as an identification mark C.

At this point, the reader device 30 may read the identification marks C of the tubes 300 disposed in the tube supporting rack 100 by scanning each of the tubes 300 disposed in the tube supporting rack 100 and identify a position of a corresponding tube 300 in the tube supporting rack 100. For example, by reading the identification mark C of the corresponding tube 300, the reader device 30 may acquire information on a position of the corresponding tube 300 in the tube supporting rack 100.

Before opening the lids 370 of the respective tubes 300 in the tube supporting rack 100, the determination device (not shown) compares information acquired by the reader device 30 and information pre-stored in the determination device (not shown). The determination device determines whether or not a corresponding tube 300 in the tube supporting rack 100 is disposed at a position recorded by an operator in the determination device. Before the tube supporting rack 100 is transferred to the tube opening and closing device, whether or not the positions of the tubes 300 are changed is checked. According to this embodiment, since the positions of the tubes 300 are checked by the determination device, it is possible to prevent that a particular sample contained in a tube 300 is transferred to a well 51 of an undesired well plate 50.

After whether or not the tubes 300 are disposed at predetermined positions in the tube supporting rack 100 is checked by the determination device, the tube opening and closing device may separate the lids 370 with respect to the containers 310 of the tubes 300. As described above, the lids 370 of the tubes 300 may be simultaneously opened by the opening and closing part 710. Accordingly, a time required to transfer samples from the tubes 300 to the well plate or the like may be reduced. In addition, by reducing the transfer time, a time in which the samples are exposed to the atmosphere due to opening of the lids 370 may be reduced.

Meanwhile, since the lids 370 of the tubes 300 are opened by the opening and closing parts 710, it is possible to avoid contact between an operator and the tubes 300. Accordingly, contamination of samples contained in the tubes 300 may be prevented.

In addition, since the lids 370 of the tubes 300 are opened by the opening and closing parts 710, it is possible to prevent that an operator spills the samples in the tubes 300 when separating the lids 370 of the tubes 300.

Meanwhile, when the lids 370 of the tubs 300 in the tube supporting rack 100 are opened, it is possible to transfer the samples contained in the tubes 300 to the well plate 50 by the pipette device 70. At this point, the pipette device 70 may automatically transfer the samples from the tubes 300 in the tube supporting rack 100 to the well plate 50. However, aspects of the present invention are not limited thereto, and an operator may manually transfer the samples by operating the pipette device 70 on his/her own.

At this point, the well plate 50 may be in a shape corresponding to a shape of the tube supporting rack 100. For example, a plurality of wells 51 formed in the well plate 50 may be formed in a structure identical to that of the plurality of openings 150 in the tube supporting rack 100. As illustrated in FIG. 15, the wells 51 of the well plate 50 may consist of twelve rows A to L, and eight columns 1 to 8. However, the arrangement of the wells 51 is not limited thereto and may differ depending on the arrangement of the openings 150 in the corresponding tube supporting rack 100.

As such, since the wells 51 of the well plate 50 are formed in the same structure as that of the openings 150 in the tube supporting rack 100, a sample contained in a tube 300 at a particular position in the tube supporting rack 100 may be transferred to a particular well 51 at a corresponding position in the well plate 50. Accordingly, it is possible to prevent samples contained in the tubes 300 from being transferred to other positions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A tube opening and closing device capable of opening and closing a lid of a tube which comprises a container, a lid coupled to the container so as to enable the container to be blocked, and a joint part for connecting the container and a first side of the lid, the tube opening and closing device comprising:

a tube supporting rack having a plurality of openings formed on one surface thereof, wherein the containers of the tubes are insertable into the plurality of openings, respectively;

an opening and closing part positioned at an upper part of the tube supporting rack, rotating around a first rotary shaft, and having a coupling groove into which a second side of the lid, facing the first side of the tube, is allowed to be accommodated; and a driving part for rotating the opening and closing part;

wherein the lid is opened and closed with respect to the container by the rotation of the opening and closing part, wherein the opening and closing part extends in a first direction, and the first rotary shaft is parallel to the first direction, wherein the opening and closing parts are provided as a plurality of opening and closing parts, and the plurality of opening and closing parts are spaced apart from each other in a second direction, and wherein the driving part comprises a second driving shaft disposed in parallel with the first direction and rotates the plurality of opening and closing parts simultaneously.

2. The tube opening and closing device of claim 1, wherein the tube supporting rack comprises:

a plurality of concave parts extending in a first direction and spaced apart from each other in a second direction crossing the first direction; and a plurality of convex parts each disposed between a pair of adjacent concave parts among the plurality of concave parts, and extending in the first direction to be parallel to the plurality of concave parts, and wherein the plurality of openings is formed in the plurality of convex parts, respectively.

3. The tube opening and closing device of claim 2, wherein the plurality of openings is arranged in the first direction to be parallel to the plurality of convex parts, respectively.

4. The tube opening and closing device of claim 3, wherein a mounting groove in contact with each of the plurality openings and accommodating the joint part is formed in each of the plurality of convex parts.

5. The tube opening and closing device of claim 2, wherein the tube supporting rack is capable of moving in the second direction under the opening and closing part.

6. The tube opening and closing device of claim 2, wherein the driving part further comprises a first worm wheel coupled to the first rotary shaft and a first worm gear rotating in engagement with the first worm wheel; and a first driving shaft coupled to the first worm gear to rotate along with the first worm gear.

7. The tube opening and closing device of claim 6, wherein the driving part further comprises:

a second worm wheel coupled to the first driving shaft;

a second worm gear rotating in engagement with the second worm wheel; and wherein the second driving shaft is disposed in parallel with the first direction, and coupled to the second worm gear to rotate along with the second worm gear.

8. The tube opening and closing device of claim 7, wherein the driving part further comprises a power part connected to the second driving shaft to rotate the second driving shaft.

9. The tube opening and closing device of claim 8, wherein the power part comprises a motor.

10. The tube opening and closing part of claim 1, wherein the opening and closing part is in a plate shape.

11. The tube opening and closing device of claim 10, wherein one side end of the opening and closing part is bent to form the coupling groove.

12. The tube opening and closing device of claim 10, wherein one side end of the opening and closing part is bent to form a bent surface, and a through-hole is formed in the bent surface, the through-hole into which one side end of the lid is insertable.

13. The tube opening and closing device of claim 1, wherein the driving part is capable of adjusting a speed of rotation of the opening and closing part.

* * * * *